Dec. 12, 1950  F. A. LEE ET AL  2,533,822
CONNECTING ROD AND CAP AND METHOD OF MAKING SAME
Filed Jan. 17, 1947  3 Sheets-Sheet 3
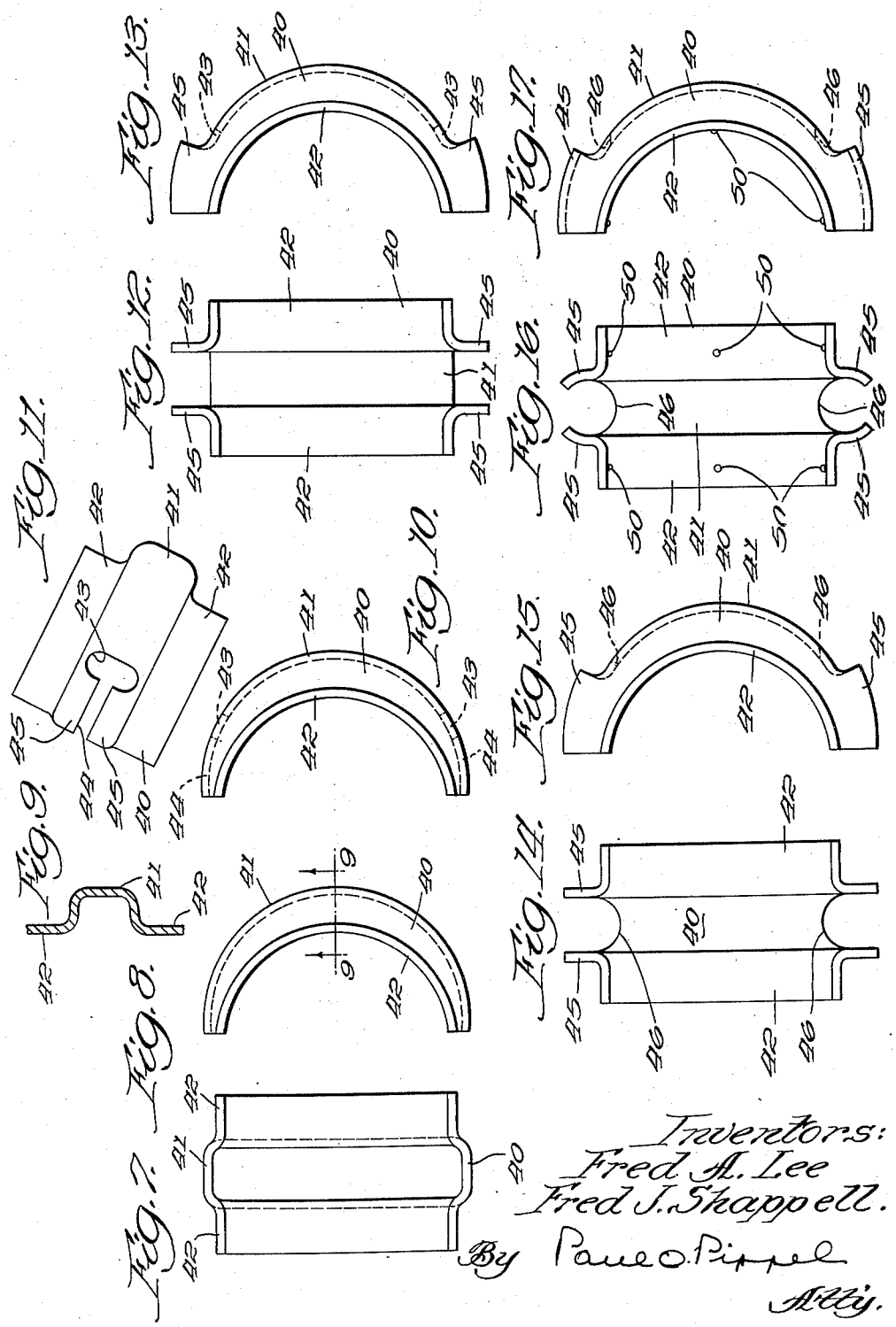
Inventors:
Fred A. Lee
Fred J. Shappell.
By Paul O. Pippel
Atty.

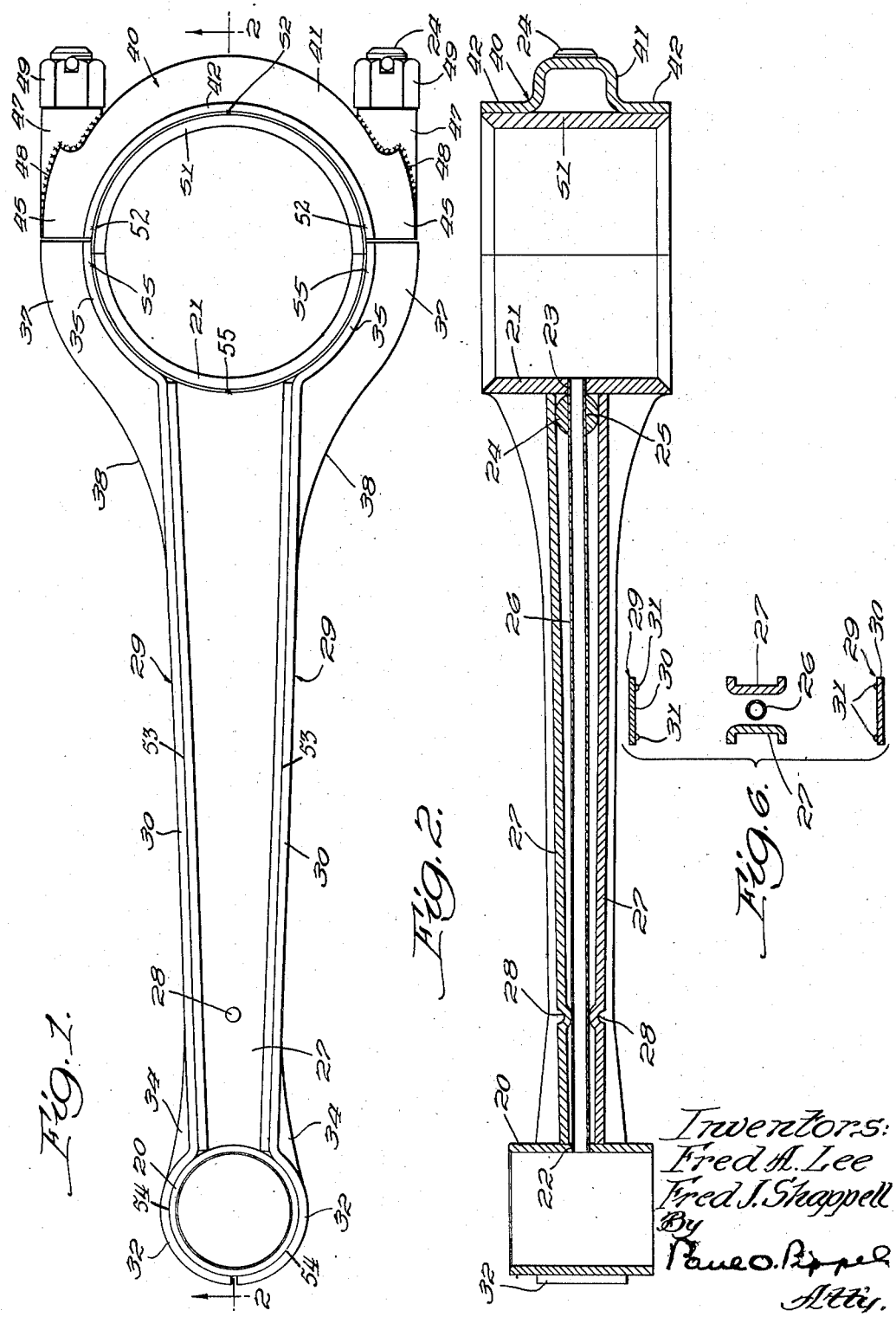

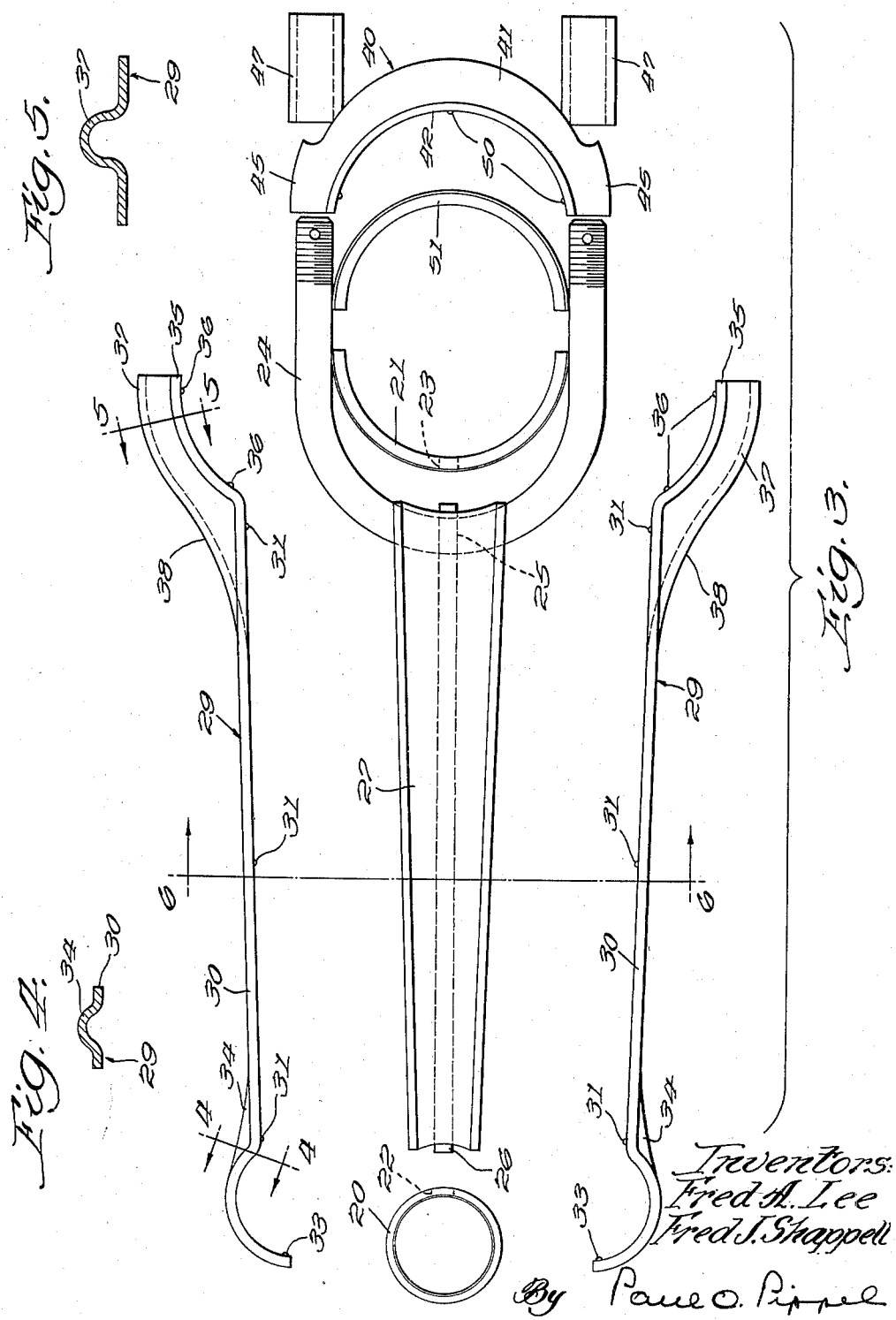

Patented Dec. 12, 1950

2,533,822

UNITED STATES PATENT OFFICE 2,533,822

CONNECTING ROD AND CAP AND METHOD OF MAKING SAME

Fred A. Lee and Fred J. Shappell, Fort Wayne, Ind., assignors to International Harvester Company, a corporation of New Jersey Application January 17, 1947, Serial No. 722,478

6 Claims. (Cl. 74—588)

1

This invention relates to a connecting rod and cap therefor and more particularly to such components as are comprised of light-weight sheet metal parts welded together. The invention also contemplates the method of making the connecting rod cap.

In many internal combustion engines, particularly those of the heavy duty type, the connecting rods are made as forgings and are characterized by relatively expensive alloys and precision manufacture. In smaller engines and in compressors it has been found that considerable expense can be saved by the use of fabricated components formed of relatively strong sheet metal. Various types of welding processes are employed to secure the sheet metal components together to form unitary structures.

It is a principal object of the present invention to provide an improved light-weight fabricated connecting rod preferably formed of sheet metal components secured together by welding. It is an important object of the invention to provide a connecting rod in which the component parts may be mass produced and easily assembled, both of which characteristics lead to inexpensive manufacture. Other objects of the invention are to provide suitably reenforced components without the addition of unnecessary weight; to assemble the parts or components so that they are mutually reenforcing; to provide improved means for lubrication of the piston pin and crank pin ends of the rod; to provide a simplified cap construction consisting of relatively few parts easily assembled and secured together as by welding; and to provide a novel method of forming the connecting rod cap.

The foregoing objects and other desirable features of the invention will become apparent to those skilled in the art as the following detailed description progresses. A preferred embodiment of the invention is shown in the accompanying sheets of drawings, in which:

Figure 1 is a side elevational view of the assembled rod and cap.

Figure 2 is a longitudinal sectional view of the rod and cap as viewed along the line 2—2 of Figure 1.

Figure 3 is an exploded view showing the components of the rod and cap.

Figure 4 is a transverse sectional view through one of the components of the rod, as viewed along the line 4—4 of Figure 3.

Figure 5 is a transverse sectional view of another portion of the same component, as viewed along the line 5—5 of Figure 3.

2

Figure 6 is a transverse sectional view in exploded form as taken on the line 6—6 of Figure 3.

Figures 7 to 17 are views showing the connecting rod cap in the various stages of its manufacture.

For the purpose of a general understanding of the construction of the preferred embodiment of the connecting rod and cap referred to herein, reference is had to Figures 1, 2 and 3. The connecting rod includes at one end thereof a tubular member 20 adapted to receive the conventional piston pin (not shown). The other end of the rod includes a semi-circular member or shell 21 adapted to fit over the crank pin of a crank shaft (not shown). The tubular member 20 is bored or otherwise provided with an aperture, as shown at 22, on an axis normal to the axis of the member. The crank-pin shell is provided with a similar aperture or bore 23 in axial alinement with the bore 22. A U-bolt 24 embraces the crank-pin shell 21 and is provided with a bore 25 which, when the U-bolt is assembled on the shell 21, is in alinement with the bore 23 in the shell. An oil tube 26 extends between the members 20 and 21 and is carried at one end in the bore 22 and at its other end passes through the opening 25 in the U-bolt 24 and is carried in the bore 23 of the shell 21.

Two channel members 27 are arranged in back-to-back relationship (Figure 6) with the oil tube 26 therebetween and parallel thereto. Each of the members is provided with an integral inwardly projecting portion 28 which serves to space the channel from the oil tube 26. The channels 27, at their opposite ends, respectively abut the members 20 and 21. As best shown in Figure 2, an intermediate portion of the U-bolt 24 fits between the channels at the proximate ends of the channels.

The connecting rod structure proper is completed by a pair of side strap members 29 which are secured to the channels 27 and which include end portions secured to the members 20 and 21. More specifically, each side strap includes a relatively long intermediate portion 30 having formed thereon a plurality of projections 31 by means of which the straps are resistance-welded, for example, to the side flanges of the channels 27 (see Figures 3 and 6). Each strap 29 is further provided at its piston pin end with an integral, continuous, substantially semi-circular portion 32. Each of these portions 32 includes a plurality of projections 33 (only one of which is shown on each strap in Figure 3) by means of which the portions 32 may be resistance-welded, for example, to the piston pin tube 20. The intermediate portion 30 and the curved portion 32 of each strap or member 29 are reenforced by means of an integral rib portion 34 formed integrally in the strap (Figures 1 and 4).

The crank pin end of each strap 29 includes an integral, continuous, arcuate portion 35 shaped to fit the crank pin shell 21. The interior surface of each arcuate portion 35 is provided with a plurality of projections 36 by means of which the portions may be resistance-welded, for example, to the member 21. In transverse cross-section, each arcuate portion 35 is as shown in Figure 5 and includes an integral semi-circular rib 37 which fits over those portions of the U-bolt 24 not embraced by the channels 27. The rib 37 is continued longitudinally into the straight portion of the strap 29 in the form of a sweeping arc of gradually diminishing cross-section, as designated by the numeral 38.

The following description will pertain to the connecting rod cap and to the method of making the same. The construction of this component and the various steps in the process of manufacture are shown in Figures 7 to 17. This cap is formed first by taking a generally rectangular blank and forming it into a generally semi-circular member 40 having a cross-section as shown in Figure 8, which comprises a central channel 41 flanged at opposite sides as at 42. The next step in the process of making the cap 40 consists in the steps of piercing and slitting substantially diametrically opposite portions of the base of the channel 41. The result of the piercing operation is designated at 43 and the slitting is shown at 44. In the particular embodiment of the invention shown, a slight amount of material is removed in the piercing and slitting operation so that portions 45 bordering the slit 44 have their inner edges spaced apart. The portions 45 are then turned or bent substantially radially outwardly, as best shown in Figures 12 and 13, to provide at each side of the member 40 a pair of laterally extending spaced mounting elements, the purpose of which will subsequently appear. As best shown in Figures 14 and 15, the diametrically opposed portions of the channel 41 in the member 40, as formed according to the preceding description, are broached to provide the arcuate portions 46.

As shown in Figure 16, the portions 45 are curved toward each other to impart thereto a substantially circular configuration coextensive respectively with the arcuate portions 46. The curved portions 45 together with the arcuate portions 46 provide a pair of mounting elements, by means of which the cap 40 may carry a pair of sleeves 47 (Figure 3). These sleeves are preferably brazed or welded in place on the cap 40 as shown at 48 in Figure 1. When the cap 40 is assembled to the rod, the sleeves 47 receive the threaded ends of the U-bolt 24 and nuts 49 are threaded on the ends of the U-bolt to secure the cap in place on the rod.

As best shown in Figures 1, 16, and 17, the flanges 42 of the member 40 are provided with a plurality of projections 50, by means of which the member 40 may be secured, as by resistance-welding, to a semi-circular cap shell 51 as shown in Figures 1 and 3. The cap shell 51 is complementary to the shell 21 previously described.

The completed cap assembly is preferably brazed at the semi-circular junction between each flange 42 and the cap 51, the line of brazing being indicated in the drawings by a plurality of small x's and being further designated by the numeral 52 in Figure 1.

Similarly the seam or junction between the straight portion 30 of each strap 29 and the sides of the channels 27 may be brazed, as designated by the numeral 53 in Figure 1. Likewise the junction of each of the arcuate portions 32 with the piston pin tubular member 20 may be brazed, as indicated by the numeral 54 in Figure 1. The arcuate portions or flanges 35 on the strap 29 may be brazed along the arcuate junctions 55 (Figure 1) to the shell 21.

The foregoing description has referred to the preferred embodiment of the invention illustrated. It is not desired, however, that the invention be limited to the exact details of construction or the exact steps in the process shown and described, for it is obvious that numerous modifications and alterations may be made in the construction and process without departing from the spirit and scope of the invention as set forth in the appended claims.

What is claimed is:

1. A light-weight connecting rod fabricated of a plurality of components secured together, comprising: a tubular piston pin member; a semi-circular crank pin member spaced from, and having its axis parallel to the axis of, the piston pin member; means forming an opening through the wall of the piston pin member on an axis normal to the axis of said member; means forming an opening similarly disposed in the wall of the crank pin member; a U-bolt embracing the crank pin member and including an opening alined with the opening in said member; an oil tube carried at one end by the opening in the piston pin member and at its other end by the openings in the U-bolt and in the crank pin member; a pair of channels arranged in back-to-back relationship with the oil tube therebetween and parallel thereto, and having their opposite ends abutting the piston pin member and the crank pin member, said channels, at their crank pin ends being arranged with a portion of the U-bolt therebetween; a pair of side straps, each lying in a plane normal to the planes of the backs of the channels, secured to the channels; and means at opposite ends of the straps securing the said ends respectively to the piston pin member and to the crank pin member.

2. The connecting rod set forth in claim 1, further characterized in that: the side straps are provided at their opposite ends with integral continuous arcuate portions respectively overlapping and secured to the piston pin member and the crank pin member.

3. The connecting rod set forth in claim 1, further characterized in that: each side strap is provided at one end with an integral continuous arcuate portion overlapping and secured to one of the members.

4. The method of making a connecting rod cap comprising the steps of: forming a blank of sheet material into a generally semi-circular member of channel cross-section with the base of the channel as the outer periphery; piercing and slitting the base of the channel adjacent the substantially opposed end sections thereof so as to provide a T-shaped slot extending longitudinally from each of said ends; bending outwardly the portions of said base that adjoin the stem of the T in each slot so that each pair of such portions extends radially outwardly in planes normal to the rotational axis of the member;

broaching the diametrically opposed ends of the channel base and bending each pair of outwardly extended portions to impart a generally circular shape thereto; and welding a sleeve within each pair of said circularly shaped portions.

5. The method of making a connecting rod cap, comprising the steps of: forming a blank of sheet material into a generally semi-circular shape; piercing transverse openings in the member proximate the substantially diametrically opposed end sections thereof, the length of said openings being substantially coextensive with the width of the center third of the member, and slitting longitudinally extending openings in the member that extend from said transverse openings to the diametrically opposed marginal ends of said member; bending outwardly the portions of said member that adjoin said longitudinal openings so that each pair of such portions extends radially outwardly in planes normal to the rotational axis of the member; broaching the diametrically opposed ends of the center third portion of the member and bending each pair of outwardly extended portions to impart a generally circular shape thereto; and welding a sleeve within each pair of said circularly shaped portions.

6. The method of making a connecting rod cap, comprising the steps of: forming a blank of sheet material into a generally semi-circular member of channel cross-section with the base of the channel as the outer periphery; piercing and slitting the base of the channel adjacent the substantially opposed end sections thereof so as to provide a T-shaped slot extending longitudinally from each of said ends; bending outwardly the portions of said base that adjoin the stem of the T in each slot so that each pair of such portions extends radially outwardly in planes normal to the rotational axis of the member; and broaching the substantially diametrically opposed ends of the channel base and bending each pair of outwardly extended portions to impart a generally circular shape thereto.

FRED A. LEE.
FRED J. SHAPPELL.

REFERENCES CITED

The following references are of record in the file of this patent:

UNITED STATES PATENTS

| Number | Name | Date |
|---|---|---|
| 1,226,978 | Layman | May 22, 1917 |
| 1,260,557 | Layman | Mar. 26, 1918 |
| 1,308,992 | Pribil | July 8, 1919 |
| 1,326,421 | Pribil | Dec. 30, 1919 |
| 1,350,177 | Pribil | Aug. 17, 1920 |
| 1,355,261 | Pribil | Oct. 12, 1920 |
| 1,378,690 | Layman | May 17, 1921 |
| 1,507,514 | Petrosky | Sept. 2, 1924 |
| 1,879,814 | Morgan | Sept. 27, 1932 |